Patented Feb. 14, 1950

2,497,349

UNITED STATES PATENT OFFICE 2,497,349

PRODUCTION OF ALICYCLIC ALCOHOLS

Adalbert Farkas, Philadelphia, Pa., and Andrew I. Smith, Long Beach, Calif., assignors to Union Oil Company of California, Los Angeles, Calif., a corporation of California No Drawing. Application August 1, 1947, Serial No. 765,626

31 Claims. (Cl. 260—617)

This invention relates to the production of synthetic organic chemicals and is particularly directed to the preparation of organic derivatives of petroleum hydrocarbon hydroperoxides. The invention is more particularly directed to the preparation of alicyclic alcohols from such hydroperoxides.

Organic peroxides and hydroperoxides are highly reactive substances which form a wide variety of reaction products with a large number of other chemicals and from which by the action of various reagents may be prepared a large number of derivatives. The hydroperoxides under certain reaction conditions may be converted into alcohols having a saturated cyclic nucleus and such alcohols are particularly desirable since these may be used as solvents, wetting agents, textile assistants, anti-blushing agents in paints and mild disinfectants. These alicyclic alcohols may also serve as raw materials in the manufacture of derivatives such as various esters to be used as plasticizers, halogenides, cycloolefins, cyclic ketones, and the like. Certain of these alicyclic or saturated cyclic alcohols have very pleasant odors, one of which is reminiscent of peppermint, and may therefore find use as perfumes or flavors.

Cyclic organic molecules having more than two carbon atoms per molecule are theoretically possible to prepare. One class of basic cyclic molecules may be considered to be the saturated cyclic or naphthene hydrocarbons of which cyclopropane is the lowest molecular weight member. Although cyclopropane is known the corresponding alicyclic alcohol, cyclopropanol, has never been isolated. Attempts to prepare this compound have heretofore invariably resulted in the formation of its isomer allyl alcohol. The higher molecular weight alicyclic alcohols having, for example, 4, 6, 7, and 9 membered rings may be prepared by inducing ring expansion with nitrous acid in a methylcycloalkylamine having 3, 5, 6, and 8 membered rings, respectively. Cyclohexanol, one of the few alicyclic alcohols which are at present available in commercial quantities, is prepared by the hydrogenation of phenol in the presence of a nickel catalyst at a temperature of about 150° C. and a pressure of about 15 atmospheres. This alcohol is largely used as a solvent and finds wide application because of its stabilizing, homogenizing and plasticizing properties.

It is a primary object of our invention to provide a new and improved method of producing valuable derivatives of organic hydroperoxides.

It is a further object to provide an improved and economical process for the preparation of alicyclic or saturated cyclic alcohols.

It is an additional object to provide a process for the economical preparation of alicyclic alcohols from selected hydrocarbon fractions which involves low pressures and temperatures of operation and mild reaction conditions.

It is a more particular object to provide a method of converting saturated cyclic or naphthene hydrocarbons present in selected petroleum fractions to organic hydroperoxides and converting substantially all of the hydroperoxides to saturated cyclic alcohols.

Other objects and advantages of this invention will become apparent to those skilled in the art as the description thereof proceeds.

Briefly, this invention comprises the liquid phase conversion of selected hydroperoxides to alicyclic alcohols with a substantially complete degree of conversion. This invention further comprises a combined method for preparing such hydroperoxides from selected hydrocarbon fractions containing naphthene hydrocarbons and converting the resulting naphthene hydroperoxides to saturated cyclic alcohols having molecules with the same carbon skeleton as that of the original naphthene hydrocarbon. These hydroperoxides are highly reactive and may be employed as the starting material in the preparation of many types of organic chemicals. Among the compounds which are readily derivable from such hydroperoxides are the metal salts of the hydroperoxide, alkyl ethers of the hydroperoxides, dinaphthenyl hydroperoxides, cyclic alkyl peroxy compounds, hydroxy peroxides and many others. These hydroperoxides may be reduced in the liquid phase either with or without the use of a catalyst to form alicyclic alcohols, and it is to the improvement of alicyclic alcohol production process that the present invention is principally directed.

We have found that the oxidation of naphthene hydrocarbons to form peroxides of the hydroperoxide type takes place readily and can be accomplished by contacting naphthene hydrocarbons with an oxygen-containing gas, for example, air, oxygen, or air enriched with oxygen, in the liquid phase. The peroxides which are produced have the formula ROOH, where R is a naphthene ring containing four to eight carbon atoms with or without one or more organic substituents attached to the ring or where R is a saturated condensed ring grouping with or without one or more organic substituents attached to the condensed ring nucleus. The organic substituents may be alkyl, cycloalkyl, aralkyl, or aryl radicals or combinations of these radicals.

Naphthene hydrocarbons or naphthene hydrocarbon mixtures suitable for use in the formation of the hydroperoxides may be substantially pure naphthenes or may comprise mixtures with paraffin, aromatic and olefin hydrocarbons. The presence of aromatic and olefin class hydrocarbons is not seriously objectionable. However, it is preferred that the amount of aromatic type hydrocarbons is less than about 10% by volume and that the amount of olefin hydrocarbons is less than about 5% by volume. It is desirable that the naphthene hydrocarbon mixture employed in the preparation of the hydroperoxides herein described contain at least 35% by volume of naphthene hydrocarbons.

Specific hydrocarbons which we may oxidize by our process include cyclobutane, cyclopentane, cyclohexane, cycloheptane, cyclooctane, and the various mono-, di-, tri-, and poly substituted saturated cyclic hydrocarbons in which the substituent groups may be methyl, ethyl, propyl, isopropyl, butyl, isobutyl, tertiary butyl, or higher alkyl radicals, for example, methylcyclopentane, dimethylcyclopentanes, ethylcyclopentane, diethylcyclopentanes, trimethylcyclopentanes, etc., and the various isomers of these substituted cyclopentanes and similar substituted cyclohexanes, cycloheptanes, etc. The substituents may also be cycloalkyl, aralkyl, aryl or combinations of two or more of these radicals or one or more alkyl radicals with one or more of these radicals. Thus compounds, such as cyclopentylcyclohexane, benzylcyclopentane, phenylcyclohexane, etc., may be employed. We may also use as oxidation feed condensed ring naphthenes, such as bicyclo-(0,1,4)-heptane, bicyclo-(0,2,4)-octane, bicyclo-(1,2,3)-octane, bicyclo-(1,1,3)-heptane, bicyclo-(0,1,3)-hexane, bicyclo-(0,2,2)-hexane, indane, tetrahydronaphthalene, decahydronaphthalene, dodecahydrofluorene, tetradecahydroanthracene, tetradecahydrophenanthrene, decahydroacenaphthene and the various substituted condensed ring naphthenes in which the substituent group may be alkyl, aralkyl, cycloalkyl, aryl or combinations of two or more of these groups.

While we may use any and all of the naphthene hydrocarbons as indicated hereinabove, we prefer to use those naphthene hydrocarbons having at least one substituent group since we have found for example that the alkyl substituted cyclobutanes, pentanes, hexanes, heptanes and octanes all oxidize more readily and yield peroxides in relatively greater proportions than do the corresponding unsubstituted naphthenes, i. e., the cyclobutane, cyclopentane, etc. The ease with which the substituted saturated cyclic hydrocarbons oxidize to produce hydroperoxides indicates that the presence of a tertiary hydrogen atom facilitates peroxide formation and it is believed that the peroxide group, i. e., the —OOH group replaces a tertiary hydrogen more readily than it does a secondary hydrogen and that in the case of methylcyclopentane, for example, the hydroperoxide group probably enters the ring at the carbon to which the methyl group is attached. The desired reaction which we obtain by our method of oxidation does not alter the chemical structure of the hydrocarbon, i. e., ring cleavage does not occur so that the carbon skeleton of the hydroperoxide is the same as the carbon skeleton of the naphthene hydrocarbon from which the peroxide is produced.

The paraffin hydrocarbons which may be present with the naphthene hydrocarbons in the hydrocarbon mixtures employed also form peroxides, to some extent at least, simultaneously with the formation of the naphthene hydroperoxides. Thus, when oxidizing feeds containing both naphthene and paraffin hydrocarbons the peroxide or peroxide concentrate produced, which may be referred to hereafter as a naphthene peroxide or naphthene hydroperoxide, may contain open chain hydrocarbon peroxides and it is intended that the term "naphthene peroxide" when employed in such cases covers any mixtures of peroxides which are obtained by the treatment described.

Peroxides which we may produce by our process in good yields and in substantially pure form include cyclopentyl hydroperoxide, methylcyclopentyl hydroperoxide, the isomeric dimethylcyclopentyl hydroperoxides, ethylcyclopentyl hydroperoxide, the isomeric diethylcyclopentyl hydroperoxides, the isomeric methylethylcyclopentyl hydroperoxides, cyclohexyl hydroperoxide, methylcyclohexyl hydroperoxide, the dimethylcyclohexyl hydroperoxides, ethylcyclohexyl hydroperoxide, the three isomeric diethylcyclohexyl hydroperoxides, the isomeric methylethylcyclohexyl hydroperoxides, 1-4 methylisopropylcyclohexyl hydroperoxide, as well as the corresponding derivatives of cyclobutane, cycloheptane, etc., and the higher molecular weight substituted cycloparaffins.

The method of carrying out the oxidation to produce saturated cyclic hydrocarbon hydroperoxides comprises heating the naphthene hydrocarbon to elevated temperatures, such as about 275° F. and blowing air or other gas containing free oxygen into the heated hydrocarbon until the peroxide content of the charge reaches the desired value. When this point has been reached the charge is removed from the oxidation vessel and treated for the recovery of peroxide as described hereinbelow. While we may operate at any temperature high enough to cause the hydrocarbon molecule to combine with oxygen, such as above about 150° F., we have found that temperatures in the order of 200° F. to 325° F. or preferably between about 240° F. and 300° F., are particularly desirable. We may oxidize at ordinary atmospheric pressure or at superatmospheric pressures, such as up to about 500 pounds per square inch gauge, however, we prefer to operate at pressures in the order of between about 50 and 150 pounds per square inch gauge. The pressure employed in any given case will depend upon the particular hydrocarbon or hydrocarbon fraction being oxidized, upon its boiling point and upon its ease of oxidation for, as is known, other factors remaining constant, the higher the pressure the more rapid will be the oxidation. When oxidizing the lower molecular weight naphthene hydrocarbons, such as methylcyclopentane, it is particularly desirable to operate under superatmospheric pressure in order to prevent volatilization of the hydrocarbon. The rate of air blowing may be varied widely and will depend upon the utilization of oxygen present in the air or oxygen containing gas. Thus sufficient air or other oxidizing gas should be supplied to effect the oxidation in a reasonable period of time. It is preferable that the air be distributed or dispersed in fine bubbles in the liquid hydrocarbon since the efficiency of oxygen utilization depends to a great extent upon the degree of dispersion of the air in the liquid. In those cases in which the oxidation is carried out under superatmospheric pressure the exit gases from the oxidation vessel may be enriched with additional quantities of fresh air or oxygen and recycled to the oxidation vessel and in this manner the percentage of oxygen in the oxidizing gas may be maintained at a relatively high value without seriously reducing the efficiency of the process from the point of view of compressing large quantities of air, the oxygen content of which is not efficiently utilized in each cycle.

Although we may effect the oxidation without the use of oxidation initiators, accelerators, catalysts, etc., we prefer to use a peroxide, such as a peroxide produced in the operation as an initiator or accelerator, as indicated hereinabove for subsequent operations. Thus in a batch oxidation or in starting a continuous oxidation process the addition of small amounts of naphthene peroxides to the naphthene hydrocarbon to be oxidized materially increases the rate of peroxide formation in the new charge by shortening the induction period. As described hereinbelow the removal of peroxides from the oxidate by the various extraction and chemical processes is not complete. Depending upon the method employed, the treated oxidate will contain from a few tenths of 1% to 2% or even 3% of peroxides, more complete removal being uneconomical in any given case. By recycling this material together with additional quantities of fresh feed to the oxidizer, there is provided sufficient oxidation initiator to cause rapid oxidation of the mixed oxidation charge.

We prefer to operate under conditions such that the formation of peroxides takes place with the minimum production of other partial oxidation products and particularly with the minimum production of acidic oxidation products since it is believed that acidic products catalyze the decomposition of peroxides. Thus it is found that in oxidizing, for example, a gasoline fraction rich in dimethylcyclopentane, the percentage of peroxides in the partially oxidized mixture reaches a maximum of about 10% to as high as about 20% by weight and if the oxidation is continued for a longer period of time the percentage of peroxides is found to decrease. Concurrently the percentage of acids increases slowly until the peroxide content has reached a maximum and then increases far more rapidly. There is, therefore, in any given case, a limit to the extent to which the oxidation can be economically carried when peroxides are the desired product. This limit, it should be pointed out, depends upon the particular hydrocarbon or hydrocarbon mixture being oxidized and also upon the conditions under which the oxidation is effected.

In order to conduct the oxidation as efficiently as possible and thereby to obtain the maximum over-all yield of the desired hydroperoxides, it is desirable to remove acidic oxidation products formed as the oxidation progresses by conducting the oxidation in the presence of a basically reacting agent. Basically reacting agents which are suitable in the process of our invention include the alkaline earth metals, the basically reacting compounds of the alkali metals, the alkaline earth metals, and the metals of the right hand column of group II of the periodic table. The preferred agents comprise the basically reacting compounds of the alkali metals, sodium, potassium and lithium, and of these sodium carbonate is the preferred agent, however, the bicarbonates and hydroxides are also suitable. These basically reacting agents are used to contact the hydrocarbon liquid being oxidized in the presence of water so as to form water-soluble salts with the acidic materials formed. These basically reacting agents may be employed in solid form as granules, lumps, or powders, or as solutions or slurries with water. The preferred mode of acid neutralization comprises adding these basically reacting agents continuously into the oxidation vessel as an aqueous solution having a concentration from as low as 0.1% to as high as about 15% by weight, the preferable concentration range being about 1% and 5% by weight. These solutions may be introduced below the level of the hydrocarbon liquid being oxidized in the oxidation vessel or preferably above the liquid level as a spray and continuously removed from the lower part of the oxidation vessel. It is also feasible to remove a portion of the liquid being oxidized, neutralize it separately and return the neutralized portion to the vessel. It is also feasible to add intermittently a quantity of the basically reacting agent so that an excess remains in the vessel to be gradually consumed by the acidic products as they are formed. The important consideration in conducting such an oxidation is that the acid content of the hydrocarbon liquid being oxidized should be maintained at a value below about 10 mg. of KOH per ml. of liquid. By maintaining the acid number below the 10 mg. value the presence of acidic constituents which have been found to be detrimental to the rate of the peroxide formation may be kept at a value which is sufficiently low so that virtually no influence on the peroxide formation rate may be exerted.

These basically reacting agents do not appear to act as catalysts in the oxidation part of our process for they do not increase the rates of formation of peroxides at a given temperature nor do they cause the reaction resulting in the formation of peroxides to take place at lower temperatures than those which would be required in the absence of the basically reacting agent. It has been found that by removing acidic oxidation products in the manner described above during the period of oxidation the proportion of peroxides in the finished oxidate may be carried to an appreciably higher value without objectionable decomposition occurring.

The type of oxidation process referred to above is a batch operation and while this method is highly satisfactory for the production of our peroxides, it is less efficient than a continuous type of operation. Such continuous operation may be effected by oxidizing a naphthene hydrocarbon or hydrocarbon fraction containing naphthene hydrocarbons until the peroxide content has reached the deside value, at which time portions of the oxidized hydrocarbon are continuously withdrawn from the oxidation vessel, treated for the removal of peroxides, and returned to the oxidation vessel together with sufficient new or unoxidized hydrocarbon feed to maintain an approximately constant liquid level in the oxidation vessel. In this type of operation peroxides are always present in the charge being oxidized and the rate of peroxide formation is readily maintained at a high level. The concentration of acidic constituents is easily maintained at a low level by continuous neutralization as previously described.

The separation of a peroxide concentrate or of substantially pure peroxides from an oxidate comprising peroxide, unoxidized hydrocarbon and other partial oxidation products of the hydrocarbon may be effected by fractional distillation, by solvent extraction, by combinations of extraction and distillation or by chemical means, such as by treatment with an alkali, or alkaline earth metal hydroxide or carbonate or other basic metal compound, in which case the salt of the peroxide may be formed and separated from the hydrocarbon mixture.

Fractional distillation processes may be employed to separate peroxides from other compounds present in the oxidate because hydroperoxides have normal boiling points at least about 175° F. above the boiling point of the hydrocarbons from which they are produced. The decomposition of the peroxides during the distillation can be minimized by reducing the distillation temperature, by carrying out the distillation under reduced pressure and/or in the presence of steam, and by reducing the heating time.

In separating a peroxide concentrate containing of the order of about 35% or more of peroxides from the oxidized hydrocarbon we may extract the hydrocarbon oxidate with, for example, 80% aqueous methyl alcohol, separating the aqueous alcohol phase from the hydrocarbon phase and subsequently diluting the alcohol phase with water to reject an oily layer comprising a major proportion of peroxides and minor proportions of other partial oxidation products and hydrocarbon. Instead of diluting the aqueous alcoholic phase with water, this phase may be distilled preferably under reduced pressures, to vaporize the alcohol and water leaving the peroxides, other oxidation products and hydrocarbon as a bottoms fraction. In this case the bottoms fraction will be a peroxide concentrate containing about 35% by weight or more of peroxides. This bottoms fraction may be further fractionally distilled as, for example, at a pressure of 0.1 millimeter of mercury whereby a richer concentrate comprising peroxides is obtained. It is preferred that the solvent be water-soluble and solvents which are applicable include the aliphatic alcohols having up to about four carbon atoms per molecule, the dihydroxy alcohols having up to about four carbon atoms per molecule, as well as polyhydroxy alcohols such as glycerol, and water-soluble ethers and esters of polyhydroxy alcohols.

In a chemical method for concentrating the peroxides produced by partial oxidation of a naphthene hydrocarbon an oxidate containing about 5% by weight of peroxide is treated with aqueous sodium hydroxide containing up to about 50% by weight of NaOH at temperatures preferably of the order of atmospheric temperature or below. After thorough mixing, the treated product is allowed to settle and separate into a hydrocarbon phase and an aqueous phase, which latter phase may contain a solid precipitate of the sodium salt of the peroxide depending upon the concentration of sodium hydroxide employed. The aqueous phase is diluted with water and acidified with a mineral acid such as dilute sulfuric acid or dilute hydrochloric acid to convert the sodium salt into the hydroperoxide. The solution may also be acidified using carbon dioxide. The reformed hydroperoxide separates from the acidified aqueous phase as an oily layer along with small amounts of other partial oxidation products and hydrocarbon. The peroxide concentrate may be fractionally distilled under vacuum to separate the peroxide in substantially pure form.

Although aqueous solutions of sodium hydroxide containing between about 5% and about 50% NaOH may be successfully employed to form the sodium salts of the hydroperoxide, we prefer to use concentrations between about 30% and about 45% by weight of NaOH for with these concentrations substantially all of the hydroperoxide which is converted into its sodium salt is insoluble in the hydrocarbon phase and only slightly soluble in the aqueous phase resulting from the extraction. The sodium peroxide salt may then be filtered or otherwise separated from the liquid materials in relatively pure form and subsequently dissolved in water and acidified with a dilute mineral acid, such as sulfuric acid, to convert the sodium salt into the hydroperoxide. The resulting hydroperoxide is relatively insoluble in the aqueous phase and forms a supernatant oily layer which may be separated from the aqueous layer by decantation. This product may be further purified if desired by fractional distillation at reduced pressures. Peroxide concentrates produced by extraction with 30% to 45% aqueous NaOH, as just described, usually contain of the order of 75% by weight or more of hydroperoxides before distillation and may contain as high as 99+% by weight of hydroperoxide after a careful vacuum fractional distillation.

In addition to sodium hydroxide to form the insoluble hydroperoxide salts, we may employ concentrated aqueous potassium hydroxide solutions and extract the hydroperoxide from the oxidate. This forms the basis for a purification process in which a separation by continuous extraction is employed.

As indicated hereinabove, a combination of distillation and chemical processes may be employed to form a particularly desirable method of recovering hydroperoxides as concentrates containing at least 75% by weight of the hydroperoxides. The distillation is preferably conducted at relatively low temperatures by using steam and/or a vacuum, and in this manner remove overhead and partially oxidized hydrocarbons other than peroxides to leave a distillation residue of between about 50% to 65% of the peroxides. The additional material comprises various alcohols and ketones and other partial oxidation products. The residue thus obtained is diluted with a quantity of a paraffinic hydrocarbon solvent or with a paraffinic hydrocarbon solvent such as propane, butane, pentane, hexane, or higher molecular weight paraffin hydrocarbons or isomers of these hydrocarbons or mixtures of the various hydrocarbons. The resulting hydroperoxide-paraffin solvent solution is then treated with a sodium hydroxide solution having a concentration of between 30% and 45% by weight of alkali metal hydroxide. This causes the precipitation of the hydroperoxide as a hydrated alkali metal-hydroperoxide salt in crystalline form which is readily separable from the solvent solution. The crystals upon being dissolved in water and acidified with a mineral acid such as sulfuric and hydrochloric, causes the separation of an oily layer comprising a peroxide concentrate containing generally 90% by weight or more of the desired hydroperoxide. If desired, this peroxide may be subsequently distilled with steam and/or vacuum as before to produce a substantially pure hydroperoxide.

The production of the various organic derivatives of hydroperoxides prepared according to the procedures described above, or any other procedure, is preferably performed using hydroperoxides in substantially pure form in order to reduce the amount of contaminants present in the product due to side reactions. However, solutions of hydroperoxides in hydrocarbon or other solvents are nearly always applicable provided of course the solvent does not interfere with the reaction. In some cases it is possible to use a partially purified hydroperoxide containing between 50% and 65% by weight hydroperoxide. These hydroperoxides prepared as hereinabove described are excellent compounds for the preparation of hydroxylated cycloparaffins and alicyclic alcohols in particular.

We have found that alicyclic alcohols may be obtained in good yields by reducing the hydroperoxide in the liquid phase with a wide variety of reducing agents. It is possible to employ hydrogen in the presence of a hydrogenation catalyst at pressures above about 200 pounds per square inch absolute and obtain a product containing a substantial concentration of the desired alicyclic alcohols. Further, we have found that the hydroperoxides may be reduced by employing hydrogen donors in the form of such compound as cyclohexane, methylcyclohexane, isopropanol, and others which are readily dehydrogenated. The hydroperoxides may be electrolytically reduced to form the desired products. Inorganic sulfur compounds which comprise particularly favorable reducing agents for effecting the hydroperoxide reduction include the water-soluble inorganic sulfur compounds in which the sulfur is present in a readily oxidizable form. Such compounds include the alkali metal sulfides, bisulfides, sulfites, thiosulfates, hydrosulfides or hydrosulfites. Hydrogen sulfide and sulfur dioxide have also been found suitable. It has been further found that organic sulfur compounds including the mercaptans, alkylsulfides, alkyl aryl sulfides and disulfides are effective in reducing the hydroperoxide. Another particularly valuable class of reducing agents which we have found suitable for forming alicyclic alcohols comprises water-soluble salts of metals present in a lower valence state and which have a higher valence state such as the water-soluble salts containing the cuprous, ferrous, mercurous, stannous, manganous, cerous, chromous, cobaltous, and nickelous ions, and the like. Hydrogen iodide has been found a suitable reducing agent as well. It has been further found that small amounts of some of the above-mentioned metal salts such as cuprous or ferrous salts may be used in conjunction with other reducing agents such as the sulfites and bisulfites, wherein they act as activators or promoters in the reduction. The hydroperoxides are highly reactive compounds as oxidizing agents, and consequently under proper control they are quite easily reduced under mild reducing conditions to form alcohols having cyclic structures with the same carbon skeleton as that of the parent compound.

Each of the above classes of reducing agents in general has a particular advantage in its use in the preparation of cyclic saturated alcohols from saturated cyclic hydroperoxides according to this invention. For example, reduction with hydrogen in the presence of a catalyst leaves no residual excess of difficulty removable reducing agent and in general the catalyst is insoluble in either hydroperoxide or the products formed and is readily separable by settling or filtration. Further, hydrogen reduction provides a quick and substantially complete reduction of the hydroperoxide. The class of reducing agents comprising the water-soluble inorganic sulfur compounds provide efficient reducing action at atmospheric pressures and temperatures and require no high pressure equipment. Because these reducing agents are water-soluble they are readily separable from the alicyclic alcohol product formed which is generally insoluble in water. The same advantages apply to the reducing agents included in the class consisting of the water-soluble salts of metals having two valence states. The following three classes of reducing agents, hydrogen under pressure in the presence of a catalyst, the water-soluble inorganic sulfur compounds in which the sulfur is present in the readily oxidizable form, and the water-soluble salts of metals having two valence states, comprise the three preferred forms of reducing agents applicable in the preparation of alicyclic alcohols from cyclic hydroperoxides according to this invention.

The reduction of the hydroperoxide with hydrogen is preferably carried out in the presence of a solvent which is inert with respect to the reduction operation. Solvents which are applicable and perhaps most readily available comprise the lower molecular weight paraffin hydrocarbons such as propane, butane, pentane, hexane and isomers of these hydrocarbons together with mixtures of these hydrocarbons or mixtures prepared during petroleum refining which contain predominantly these hydrocarbons. An inert solvent comprising at least one aliphatic hydrocarbon having between about 3 and about 8 carbon atoms per molecule is desirable. The proportion of paraffin solvent employed in the production depends to a good extent upon the pressure of hydrogen to be used and may vary between about 5 and about 50 volumes per volume of hydroperoxide, the main functions of the solvent being to insure an intimate contact of the reducing agent and catalyst with the hydroperoxide and to modify the velocity of the reduction reaction. It is preferred to use an amount of solvent in the ratio of about 20 volumes to 1 volume of hydroperoxide. It has been found possible to perform hydroperoxide reduction with hydrogen at pressures above about 100 pounds per square inch absolute to as high as 2,000 pounds per square inch absolute or higher. In view of the high reactivity of the hydroperoxide the somewhat lower pressures in the aforementioned range are preferred, such pressures being between about 200 and 700 pounds per square inch absolute. The preferred temperatures of the reduction are moderate, being between about 150° F. and 250° F. However, temperatures as low as about room temperature to as high as about 400° F. are permissible. Hydrogenation catalysts which are suitable for this reduction include, nickel, platinum, platinum oxide, palladium, copper, copper chromite, and other hydrogenation catalysts which catalyze mild reduction reactions.

The product formed from reduction using hydrogen comprises a mixture of the solvent which as previously described may comprise a low molecular weight aliphatic hydrocarbon together with the reduction products of the hydroperoxide. Ordinarily conventional fractionation techniques suffice to recover the solvent from the reaction product after the catalyst has been removed by filtration or decantation. Generally the reduction products are compounds having considerably higher boiling points than the hydrogenation solvent which facilitates the separation. A fractionation by distillation under reduced pressure of the solvent-free product generally suffices to separate substantially pure fractions of individual alicyclic alcohols formed from the hydroperoxide.

A more clear understanding of the hydrogenation reduction of a cyclic hydroperoxide may be obtained by reference to the following example:

*Example I*

A naphthenic hydroperoxide was prepared by oxidation of substantially pure methylcyclohexane, according to the procedures hereinabove described. The product was purified by steam distillation and precipitation of the sodium salt of the hydroperoxide which, followed by acidification of an aqueous solution of the sodium salt, yielded a substantially pure methylcyclohexane hydroperoxide. A solution comprising 195 parts by weight of methylcyclohexane hydroperoxide and 1250 parts by weight of normal pentane was introduced into a high pressure shaking autoclave with 10 grams of a nickel catalyst. The hydroperoxide solution had a volumetric solvent-hydroperoxide ratio of about 20 to 1. The material was heated to between 200° F. and 225° F. for a period of six hours under a hydrogen pressure of 700 pounds per square inch during which time the material in the autoclave was agitated. At the end of this period the autoclave was cooled, the pressure released, and the reduced product removed and found to contain no hydroperoxide. On distilling the solvent-free product after removal of the nickel catalyst, 73% by volume of 1-methylcyclohexanol-1 and 27% by volume of a mixture of 1-methylcyclohexanol-2, and of 1-methylcyclohexanol-3 and -4 were found. These alicyclic alcohols were found to have the following boiling points at 100 millimeters of mercury:

| Alcohol | Boiling Point, °F. | Volume Per Cent |
|---|---|---|
| 1-methylcyclohexanol-1 | 208 | 73 |
| 1-methylcyclohexanol-2 | 230 | 27 |
| 1-methylcyclohexanol-3 and -4 | 239 to 241 | |
| | | 100 |

The pressure employed in this experimental hydroperoxide reduction was somewhat excessive and substantially the same products have been obtained by using pressures in the range of 200 to 700 pounds per square inch absolute, other conditions being substantially the same.

The second class of preferred reducing agents comprises the water-soluble inorganic sulfur compounds wherein the sulfur is present in a readily oxidizable form. These reducing agents are preferably employed as their aqueous solution having a concentration of from 1% to 2% by weight to as high as about 50% by weight or as high as solubility characteristics permit. Such water-soluble inorganic water sulfur compounds include the sulfites, bisulfites, hydrosulfide, or thiosulfate, the sulfides, the hydrosulfides and similar sulfur-containing salts of such cations as the alkali metals, the alkaline earth metals, and ammonia. Included also in this class of inorganic sulfur compounds are sulfur dioxide and possibly hydrogen sulfide if pressures are employed which we have found to represent efficient reducing agents for converting hydroperoxides to alicyclic alcohols. It is preferred to employ the inorganic sulfur reducing agents other than sulfur dioxide or hydrogen sulfide as their sodium or ammonium salts for reasons of economy, availability and solubility. We further prefer to reduce the hydroperoxides in the presence of these inorganic sulfur compounds at temperatures ranging from between normal atmospheric temperature of about 70° F. to 160° F.

The operation of reducing cyclic hydroperoxides to form alicyclic alcohols according to this invention by employing aqueous solutions of the aforementioned inorganic sulfur compounds may be more readily understood by reference to the following example:

EXAMPLE II

A concentrate containing various alkylated cyclopentane and cyclohexane hydroperoxides having from 6 to 8 carbon atoms per molecule was prepared by a liquid phase oxidation of a gasoline rich in naphthene hydrocarbons. A reducing solution was prepared by dissolving 150 parts by weight of sodium sulfite in 500 parts by weight of water. This solution was employed to reduce 95 parts by weight of the hydroperoxide concentrate previously mentioned at a temperature which rose during the reduction from room temperature to 120° F. The hydroperoxide was thoroughly agitated with the aqueous solution of sodium sulfite. After a period of about four hours an addition of eight parts by weight of sodium bisulfite was made to the reaction mixture and at the end of five hours total reaction time analysis of the resulting mixture indicated the complete reduction of hydroperoxide. The product was cooled and the upper water-insoluble phase containing the reduced hydroperoxide was separated from the lower aqueous phase. The empirical formula of the resulting mixture was found to be $C_{6.3}H_{13}O$ and the mixture had a refractive index of 1.4459. Upon distillation at atmospheric pressure the boiling range of the mixture was determined to be 295° F. to 324° F. The mixture of alicyclic alcohols which has a strong pleasant odor reminiscent of peppermint was found to have a density at 68° F. of 0.896 gram per ml., or about 7.5 pounds per gallon. These properties indicated that the mixture of alcohols comprised about 80% of alicyclic alcohols which were predominantly methyl-, dimethylcyclopentanols, and cyclohexanols.

The third class of preferred reducing agents which has been found useful in the preparation of alicyclic alcohols from hydroperoxides include inorganic compounds containing a cation which is present in its lower valence state but which is readily oxidizable to a higher valence state. It is further preferred that these cations be in the form of water-soluble salts so that they may be used as aqueous solutions having concentrations such as from about 1 or 2% to as high as about 50% by weight where solubility characteristics permit and in which form they are easily and conveniently handled. Among the water-soluble salts which conform to these requirements are the water-soluble salts containing the cuprous, ferrous, mercurous, stannous, manganous, cerous, chromous, cobaltous, and nickelous ions, and the like, and ions of other metals in their lower valence state. Of these, the preferred salts are those of cuprous copper and ferrous iron, and particularly the latter because of ready availability and solubility.

It is preferred that the hydroperoxide reductions employing these lower valent metal ions as reducing agents be carried out at temperatures between about 70° F. and about 160° F. or higher and be aided by a thorough agitation of the hydroperoxide being reduced and the aqueous solution of the particular reducing agent being employed. We also prefer to employ an excess of reducing agent amounting to between about 10% and about 50% of that theoretically required to reduce the hydroperoxide to the corresponding alcohol. Following a reduction of the peroxide with an aqueous solution of such a reducing agent the resulting mixture is cooled and the aqueous and water-insoluble phases are separated. If desired, the aqeous phase may be treated with a suitable reducing reagent to return the metal ion from its upper to its lower valence state in which condition it may be re-employed in the reduction of further quantities of hydroperoxide. The water-insoluble phase containing the alicyclic alcohols may be subsequently distilled with steam and/or a vacuum to permit separation of the mixture into the individual alicyclic alcohols.

The reduction of a quantity of hydroperoxide to the corresponding saturated cyclic alcohols by treatment with an aqueous solution of a metal salt as above described may be more clearly understood by reference to the following example:

EXAMPLE III

A reducing solution was prepared by dissolving 160 parts by weight of ferrous sulfate-pentahydrate in sufficient water to make about a 15% solution by weight. This solution was cooled to about 60° F. and 790 parts by weight of a 6.7% by weight methylcyclohexane hydroperoxide oxidate was added over a period of from 1.5 to 2.0 hours with thorough agitation. Following the hydroperoxide addition a water-insoluble phase was separated from the spent reduction solution and found to contain 0.5% to 0.6% by weight of the hydroperoxide. This insoluble phase was alkali extracted and fractionated to recover the oxygenated compounds from the unreacted hydrocarbon. The oxygenated compounds were further fractionated at 100 mm. pressure and found to have the following composition:

| Compound | Volume Per cent |
|---|---|
| Heptanone-2 | 34 |
| Cyclic ketone | 13 |
| 1-methycyclohexanol-1 | 10 |
| Higher alcohols, and ketones | 43 |
|  | 100 |

The quantities of ketones found in the fractionated product are believed to have been formed during the oxidation of a methylcyclohexane-bearing gasoline cut rather than during the reduction.

In order to illustrate more clearly the complete series of operations employed in producing an alicyclic alcohol mixture by one method which is preferred, the following example is given:

*Example IV*

A gasoline distilled from a California crude oil in the course of petroleum refining operations was further fractionated to produce a material having a boiling range of from about 200° F. to 260° F. This material contained a high concentration of naphthene and alkylated naphthene hydrocarbons including methylcyclopentane, dimethylcyclopentane, methylcyclohexane, and the like, and contained only a small amount, less than 10% by volume, of aromatic hydrocarbons. This selected hydrocarbon fraction was introduced at the rate of 0.8 gallon per hour into the top of a vertical stainless steel oxidation vessel having a total volume of about 1.85 gallons. The vessel was equipped with heating coils together with a spider for the introduction and dispersion of air in the lower part. Air was introduced into the oxidation vessel at the rate of about 16.0 cubic feet per hour under pressure of 145 pounds per square inch absolute. The temperature of the reaction was maintained at 290° F. In order to inhibit the accumulation of acidic constituents in the oxidation vessel which have been shown to deleteriously effect the rate of formation of the desired hydroperoxides, an aqueous solution containing 5% by weight of sodium carbonate was sprayed into the upper part of the oxidation vessel at a rate of 0.52 gallon per hour. This aqueous sodium carbonate solution passed downwardly through the hydrocarbon being oxidized and served to form water-soluble salts of acidic constituents which thus were continuously removed with the aqueous phase from the bottom of the oxidation vessel. The amount of liquid maintained in the vessel was about 1.3 gallons and the level was controlled by varying the rate of product removal. The product was continuously removed from the vessel and separated into two phases, an aqueous phase being formed due to the removal of a small amount of water with the hydrocarbon oxidate. The oxidate comprised between about 6% to 8% by weight of hydroperoxide together with mixed alcohols and ketones as well as unreacted hydrocarbons. The actual hydroperoxide concentration in the product fluctuated somewhat during oxidation between the limits given. The oxidate was steam distilled to remove the unreacted hydrocarbon and the lower boiling oxygenated compounds which included alcohols and ketones from the mixture. This operation left as a residue a concentrate containing between 50% and 60% by weight of the desired hydroperoxides.

The residue may be further purified if desired by the precipitation in the presence of a low molecular weight paraffin hydrocarbon solvent of the alkali metal salts of the hydroperoxide. The alkali metal salt may be subsequently dissolved in water, acidified, and the hydroperoxide separated in substantially pure form.

In this case it was desirable to separate alcohols, ketones and other nonacidic oxygenated compounds formed during the hydrocarbon oxidation. Therefore, two distillation steps were performed in which the unreacted gasoline was recycled to the oxidation vessel for further treatment and the non-acidic oxygenated compounds recovered as an overhead product in a second distillation step. From the second distillation a residue consisting of the hydroperoxide concentrate was obtained having a concentration of 60% by weight.

The hydroperoxide concentrate obtained as a distillation residue as previously described contained various alkylated cyclopentane and cyclohexane hydroperoxides having from 6 to 8 carbon atoms per molecule. A fraction of the hydroperoxide concentrate obtained as above described amounting to 230 parts by weight was thoroughly agitated with an aqueous solution comprising 380 parts by weight of sodium sulfite and 450 parts by weight of water. During a period of about four hours the temperature of the reaction mixture rose to about 120° F. and began to decrease indicating the substantial completion of the reduction reaction. At the end of the four-hour period 125 parts by weight of sodium sulfite and 20 parts by weight of sodium bisulfite were added to the mixture and agitated for a further period of one hour. The mass of reaction mixture was removed and allowed to stratify and analysis of the water-insoluble or alcohol phase indicated that no hydroperoxide remained. The alcohol phase was distilled and found to contain over 80% by volume of alicyclic alcohols. The resulting mixture had a boiling range of from 174°

F. to 230° F. at 100 mm. of mercury pressure, and was found to contain such alicyclic alcohols as 1-methylcyclohexanol-1 in the fractions boiling below 200° F. and predominantly 1-methylcyclohexanol-2 in the fraction boiling above 200° F.

The hydroperoxides prepared according to the processes as herein described being highly reactive compounds are readily converted by processes other than reduction into numerous other compounds which have modified activities. Various alkyl ethers may be prepared having the general formula:

wherein R and R' may be alkyly or cycloalkyl, aralkyl, or other radicals of the hydroperoxides from which the alicyclic alcohols are derived according to the present invention. Such alkyl ethers are prepared by reacting the hydroperoxides with an alkyl ester in alkaline solution or by reacting a salt of the hydroperoxide with an alkyl halide. These hydroperoxides also readily form hydroxy peroxides by condensation under anhydrous conditions with aldehydes and ketones. These compounds may have the general formula:

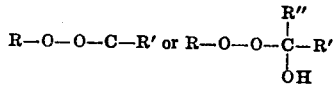

wherein R, R' and R'' may be alkyl, aryl, cycloalkyl, or aralkyl radicals. The reaction of the hydroperoxides with acid anhydrides, acids, or ketenes or from the reaction of hydroperoxide salts with acyl chlorides will result in the formation of a series of compounds known as peresters. Compounds having the general formula:

may be formed through reaction of the hydroperoxides with dihalogenated substituted compounds wherein R' may be aryl, alkyl, or cycloalkyl radicals and where R is a cycloalkyl radical derived from the hydroperoxide. A series of compounds known as peroxy alcohols may be formed through the reaction of hydroperoxide with olefin oxides in which the general formula is:

wherein R is the cycloalkyl radical of the hydroperoxide and R' is the redical of the olefin oxide. In many cases where the hydroperoxides are useful compounds the above peroxy derivatives are also useful compounds and may be preferred over the parent hydroperoxide because of certain modified properties of stability, reactivity, solubility, or viscosity which are more advantageous.

The foregoing description and examples of our invention are not to be taken as limiting since many variations may be made by those skilled in the art without departing from the spirit or the scope of the following claims:

We claim:

1. A method for the production of an alicyclic alcohol which comprises oxidizing in the liquid phase a saturated cyclic hydrocarbon having from 4 to 8 carbon atoms per molecule with a gas containing free oxygen to produce an oxidate containing the hydroperoxide of said cyclic hydrocarbon in substantial amount and reducing said hydroperoxide to form an alicyclic alcohol having the same carbon skeleton as said hydrocarbon.

2. A method for the production of an alicyclic alcohol which comprises oxidizing in the liquid phase a saturated cyclic hydrocarbon having from 4 to 8 carbon atoms per molecule with a gas containing free oxygen to produce an oxidate containing the hydroperoxide of said cyclic hydrocarbon in substantial amount, separating said hydroperoxide from said oxidate in substantially pure form, and reducing said hydroperoxide to form an alicyclic alcohol having the same carbon skeleton as said hydrocarbon.

3. A method for the production of an alicyclic alcohol which comprises oxidizing a saturated cyclic hydrocarbon having between 4 and 8 carbon atoms per molecule in the liquid phase at a temperature between about 150° F. and 325° F. and at a pressure of between normal atmospheric pressure and about 500 pounds per square inch gauge with a gas containing free oxygen to produce an oxidate containing the hydroperoxide of said cyclic hydrocarbon in substantial amount, separating said hydroperoxide from said oxidate, and subjecting the thus separated hydroperoxide to a liquid phase reduction to form an alicyclic alcohol having the same carbon skeleton as said cyclic hydrocarbon.

4. A method according to claim 3 wherein said saturated cyclic hydrocarbon comprises a petroleum fraction containing at least 35% by volume of saturated cyclic hydrocarbons having from about 4 to 8 carbon atoms per molecule.

5. A method for producing alicyclic alcohols which comprises heating a selected petroleum fraction containing at least 35% by volume of saturated cyclic hydrocarbons having between about 4 and 8 carbon atoms per molecule to between 240° F. and 300° F. under a pressure of from about 50 to about 150 pounds per square inch gauge, oxidizing said petroleum fraction in the liquid phase by contacting said petroleum fraction with a gas containing free oxygen in the presence of a basically reacting agent to form an oxidate containing hydroperoxides of said cyclic hydrocarbons in substantial amount, fractionating said oxidate to separate said hydroperoxides in substantially pure form, and contacting the thus separated hydroperoxides with a reducing agent thereby forming alicyclic alcohols having the same carbon skeleton as said cyclic hydrocarbons.

6. A method according to claim 5 wherein said selected petroleum fraction containing at least 35% by volume of saturated cyclic hydrocarbons also contains less than 10% by volume of aromatic hydrocarbons and less than about 5% by volume of olefinic hydrocarbons.

7. A method according to claim 5 wherein said saturated cyclic hydrocarbons comprise methylcyclopentane.

8. A method according to claim 5 wherein said saturated cyclic hydrocarbons comprise methylcyclohexane.

9. A method according to claim 5 wherein said saturated cyclic hydrocarbons comprise dimethylcyclopentane.

10. A method for producing an alicyclic alcohol which comprises reducing a saturated cyclic hydroperoxide in the liquid phase with a reducing agent to form said alicyclic alcohol having the same carbon skeleton as said hydroperoxide.

11. A method according to claim 10 wherein said saturated cyclic hydroperoxide comprises methylcyclopentyl hydroperoxide.

12. A method according to claim 10 wherein said saturated cyclic hydroperoxide comprises ethylcyclohexyl hydroperoxide.

13. A method according to claim 10 wherein said saturated cyclic hydroperoxide comprises isomeric dimethylcyclopentyl hydroperoxides.

14. A method of producing an alicyclic alcohol which comprises contacting a saturated cyclic hydroperoxide in the liquid phase with hydrogen in the presence of a hydrogenation catalyst thereby reducing said hydroperoxide to form said alicyclic alcohol.

15. A method according to claim 14 wherein said hydroperoxide is reduced under hydrogen pressure of between about 100 and 2,000 pounds per square inch absolute and at a temperature of between 100° F. and 400° F.

16. A method of producing an alicyclic alcohol which comprises dissolving a saturated cyclic hydroperoxide in an inert solvent to form a hydroperoxide solution, suspending a hydrogenation catalyst in said hydroperoxide solution, maintaining said solution at between room temperature and 250° F., agitating said solution to maintain said catalyst in suspension therein, contacting said heated and agitated solution with hydrogen under a pressure of from about 200 to about 700 pounds per square inch absolute thereby reducing said hydroperoxide to form a mixture of said alicyclic alcohol and said inert solvent, separating said catalyst from said mixture, and separating said alicyclic alcohol from said solvent.

17. A method according to claim 16 wherein said hydrogenation catalyst comprises nickel.

18. A method according to claim 16 wherein said inert solvent comprises at least one aliphatic hydrocarbon having between about 3 and about 8 carbon atoms per molecule.

19. A method according to claim 16 wherein the volumetric ratio of said inert solvent to said hydroperioxide is between about 5 and about 50.

20. A method for producing an alicyclic alcohol which comprises reducing a saturated cyclic hydroperoxide with an aqueous solution of at least one water-soluble inorganic sulfur compound wherein the sulfur atom in said sulfur compound is in a readily oxidizable form.

21. A method according to claim 20 wherein said water-soluble inorganic sulfur compound comprises at least one water-soluble sulfite.

22. A method for producing alicyclic alcohols from saturated cyclic hydroperoxides which comprises preparing an aqueous solution containing from about 1% to about 2% by weight to as high as about 50% by weight of sodium sulfite, heating said aqueous solution and said saturated cyclic hydroperoxides separately to between about 70° F. and 160° F., combining said hydroperoxides and said aqueous solution, agitating the resulting mixture thereby effecting the reduction of said hydroperoxides to the corresponding alicyclic alcohols to form a reaction product, separating an alcohol phase and the water phase present in said reaction product, and fractionating said alcohol phase to recover and separate individual alicyclic alcohols therefrom.

23. A method for producing an alicyclic alcohol which comprises reducing a saturated cyclic hydroperoxide with an aqueous solution of a polyvalent metal salt wherein the metal is present in one of its lower valence states thereby forming an alicyclic alcohol corresponding to said hydroperoxide.

24. A method according to claim 23 wherein said polyvalent metal salt comprises a salt of a metal in one of its lower valence states selected from the metals of group VIII in the periodic table.

25. A method for producing alicyclic alcohols from saturated cyclic hydroperoxides which comprises preparing an aqueous solution containing up to about 50% by weight of ferrous sulphate, heating the said aqueous solution and saturated cyclic hydroperoxides separately to a temperature of between 70° F. and 160° F., combining said hydroperoxides and said aqueous solution, agitating the resulting mixture thereby effecting the reduction of said hydroperoxides to the corresponding alicyclic alcohols to form a reaction product, separating an alcohol phase from an aqueous phase in said reaction product, and fractionating said alcohol phase to separate individual alicyclic alcohols therefrom.

26. A method for the production of an alicyclic alcohol which comprises oxidizing a naphthene hydrocarbon in the liquid phase with a gas containing oxygen to form a naphthene hydroperoxide, maintaining the acidity of said liquid phase at a value equivalent to less than 10 mg. of KOH per ml. of liquid during the oxidation, and reducing said naphthene hydroperoxide to form said alicyclic alcohol having the same carbon skeleton as said hydrocarbon.

27. A method for producing an alicyclic alcohol which comprises oxidizing a naphthene hydrocarbon in the liquid phase with air in the presence of a basically reacting agent to form a naphthene hydroperoxide, separating said naphthene hydroperoxide from said liquid phase, and reducing said hydroperoxide to said alicyclic alcohol having the same carbon skeleton as said hydrocarbon.

28. A method for producing an alicyclic alcohol which comprises oxidizing a naphthene hydrocarbon in the liquid phase with air under superatmospheric pressure to form a naphthene hydroperoxide, maintaining the acidity of said liquid phase at a value less than that equivalent to 10 mg. of KOH per ml. during said oxidation by conducting the oxidation in the presence of a basically reacting agent, and reducing said naphthene hydroperoxide to an alicyclic alcohol having the same carbon skeleton as said hydroperoxide by contacting said hydroperoxide with a water-soluble inorganic reducing agent.

29. A method according to claim 28 wherein said alicyclic alcohol comprises methylcyclopentanol.

30. A method according to claim 28 wherein said alicyclic alcohol comprises 1-methylcyclohexanol-1.

31. A method according to claim 28 wherein said alicyclic alcohol comprises dimethylcyclopentanol.

ADALBERT FARKAS.
ANDREW I. SMITH.

REFERENCES CITED

The following references are of record in the file of this patent:

UNITED STATES PATENTS

| Number | Name | Date |
|---|---|---|
| 1,924,786 | Hartmann et al. | Aug. 29, 1933 |
| 2,114,717 | Lazier | Apr. 19, 1938 |
| 2,369,181 | Rust et al. | Feb. 13, 1945 |
| 2,430,865 | Farkas et al. | Nov. 18, 1947 |

OTHER REFERENCES

Yule et al., "Peroxides and Gum in Gasoline," Ind. Eng. Chem., vol. 23, pages 1254–1259 (6 pages) (November 1931).